US012657891B2

(12) United States Patent
Kanazawa

(10) Patent No.: US 12,657,891 B2
(45) Date of Patent: Jun. 16, 2026

(54) GENERATION OF MACHINE LEARNING OUTPUTS USING A DOMAIN INDEX MATRIX TO CONTROL A RELATIVE CONTRIBUTION OF MULTIPLE DIFFERENT TRAINING DATA SETS

(71) Applicant: Google LLC, Mountain View, CA (US)

(72) Inventor: Noritsugu Kanazawa, Campbell, CA (US)

(73) Assignee: GOOGLE LLC, Mountain View, CA (US)

( * ) Notice: Subject to any disclaimer, the term of this patent is extended or adjusted under 35 U.S.C. 154(b) by 814 days.

(21) Appl. No.: 17/998,329

(22) PCT Filed: Jul. 26, 2021

(86) PCT No.: PCT/US2021/043134
§ 371 (c)(1),
(2) Date: Nov. 9, 2022

(87) PCT Pub. No.: WO2023/009101
PCT Pub. Date: Feb. 2, 2023

(65) Prior Publication Data
US 2024/0221371 A1 Jul. 4, 2024

(51) Int. Cl.
*G06V 10/778* (2022.01)
*G06V 10/771* (2022.01)
(52) U.S. Cl.
CPC ........ *G06V 10/7788* (2022.01); *G06V 10/771* (2022.01)
(58) Field of Classification Search
None
See application file for complete search history.

(56) References Cited

U.S. PATENT DOCUMENTS 10,460,240 B2 * 10/2019 Saxena ................ G06F 16/258
12,277,589 B2 * 4/2025 Ma ......................... G06N 20/00
(Continued)

FOREIGN PATENT DOCUMENTS

| JP | 2010272109 A | 12/2010 |
| JP | 2021082293 A | 5/2021 |
| WO | 2020/107022 | 5/2020 |

OTHER PUBLICATIONS

Japanese Patent Office, Notice of Allowance mailed on Feb. 5, 2024, issued in connection with Japanese Patent Application No. 2022580471, 3 pages.
(Continued)

*Primary Examiner* — Tahmina N Ansari
(74) *Attorney, Agent, or Firm* — DORITY & MANNING P.A.

(57) ABSTRACT

A method includes obtaining an input matrix and determining a domain index matrix that includes, for each respective input value of the input matrix, a corresponding domain index value that indicates a corresponding training data distribution of a plurality of training data distributions. The method also includes providing the input matrix and the domain index matrix to a machine learning model that has been trained using the plurality of training data distributions, where each respective training data distribution is associated with a different attribute. The method further includes generating, by the machine learning model and based on the input and the domain index matrices, an output matrix that includes, for each respective input value, a corresponding output value generated based on (i) the respective input value and (ii) the corresponding domain index value such that the corresponding output value exhibits the attribute of the corresponding training data distribution.

20 Claims, 12 Drawing Sheets

(56) References Cited

U.S. PATENT DOCUMENTS

| | | | |
|---|---|---|---|
| 12,469,483 B1 * | 11/2025 | Tran | G10L 15/26 |
| 2007/0282768 A1 * | 12/2007 | Chang | G06N 5/02 |
| | | | 706/16 |
| 2018/0129714 A1 * | 5/2018 | Saxena | G05B 19/41845 |
| 2018/0285780 A1 * | 10/2018 | Ouyang | G06F 17/18 |
| 2020/0251100 A1 * | 8/2020 | Tan | G06N 3/096 |
| 2022/0366263 A1 * | 11/2022 | Ji | G06N 3/0895 |
| 2023/0244996 A1 * | 8/2023 | Kumar | G06N 20/00 |
| | | | 706/12 |
| 2024/0022726 A1 * | 1/2024 | Wang | G06V 10/82 |
| 2024/0221371 A1 * | 7/2024 | Kanazawa | G06N 3/096 |
| 2025/0053823 A1 * | 2/2025 | Hamm | G06N 3/045 |

OTHER PUBLICATIONS

Alhashim et al., "High Quality Monocular Depth Estimation via Transfer Learning," arXiv:1812.11941v2, Mar. 10, 2019, 12 pages.
Godard et al., "Unsupervised Monocular Depth Estimation with Left-Right Consistency," arXiv:1609.03677, 2016, 10 pages.
International Searching Authority, International Search Report and Written Opinion mailed on May 9, 2022, issued in connection with International Patent Application No. PCT/US2021/043134, filed Jul. 26, 2021, 18 pages.
Katrolia et al., "An Adversarial Training based Framework for Depth Domain Adaptation," Conference: VISAPP 2021 International Conference on Computer Vision Theory and Applications, Nov. 2020, 9 pages.
Ranftl et al., "Towards Robust Monocular Depth Estimation: Mixing Datasets for Zero-shot Cross-dataset Transfer," IEEE Transactions on Pattern Analysis and Machine Intelligence, arXiv:1907.01341v3, Aug. 25, 2020, 14 pages.

* cited by examiner

FRONT VIEW            RIGHT SIDE VIEW            BACK VIEW

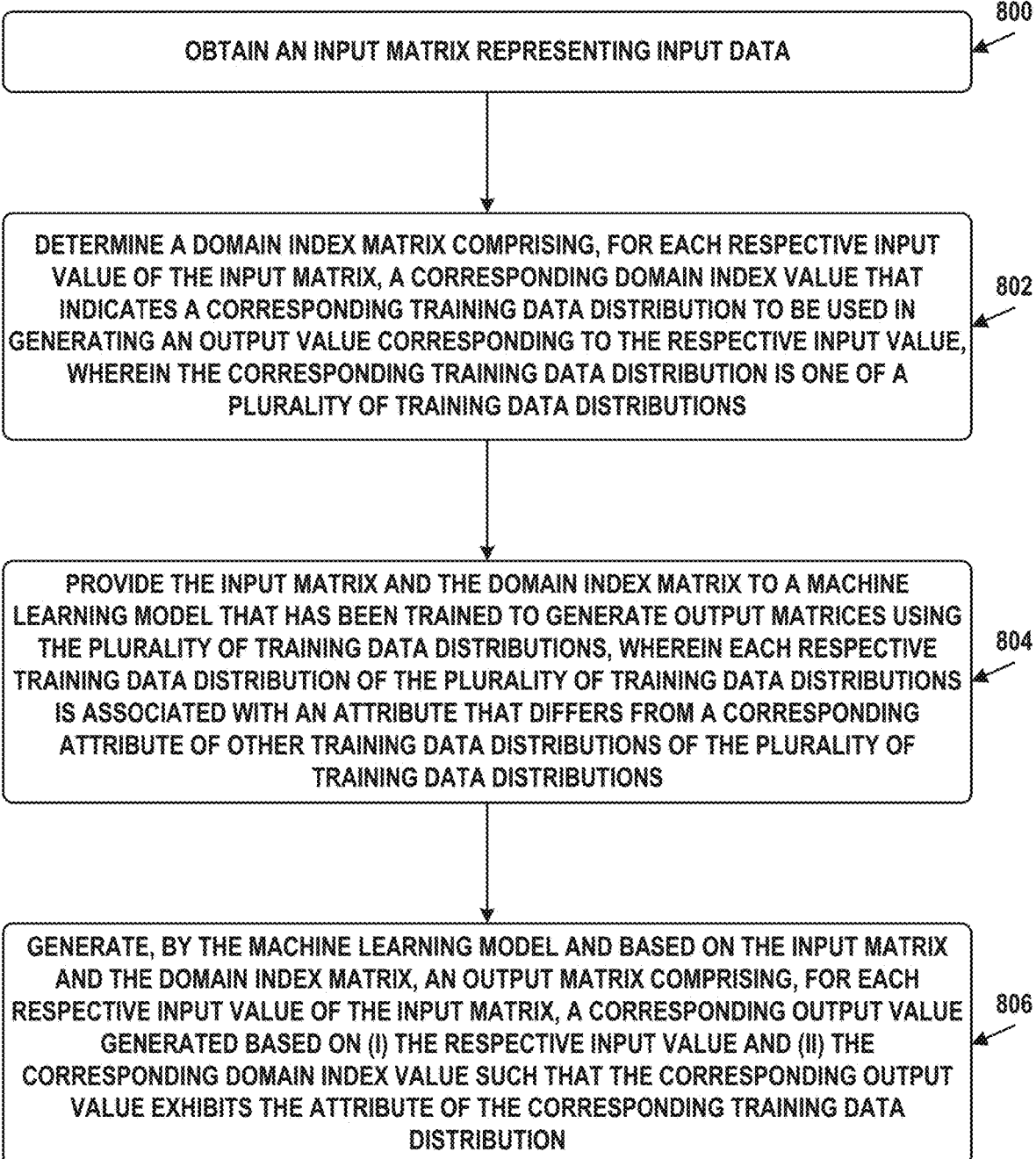

OBTAIN AN INPUT MATRIX REPRESENTING INPUT DATA

800

DETERMINE A DOMAIN INDEX MATRIX COMPRISING, FOR EACH RESPECTIVE INPUT VALUE OF THE INPUT MATRIX, A CORRESPONDING DOMAIN INDEX VALUE THAT INDICATES A CORRESPONDING TRAINING DATA DISTRIBUTION TO BE USED IN GENERATING AN OUTPUT VALUE CORRESPONDING TO THE RESPECTIVE INPUT VALUE, WHEREIN THE CORRESPONDING TRAINING DATA DISTRIBUTION IS ONE OF A PLURALITY OF TRAINING DATA DISTRIBUTIONS

802

PROVIDE THE INPUT MATRIX AND THE DOMAIN INDEX MATRIX TO A MACHINE LEARNING MODEL THAT HAS BEEN TRAINED TO GENERATE OUTPUT MATRICES USING THE PLURALITY OF TRAINING DATA DISTRIBUTIONS, WHEREIN EACH RESPECTIVE TRAINING DATA DISTRIBUTION OF THE PLURALITY OF TRAINING DATA DISTRIBUTIONS IS ASSOCIATED WITH AN ATTRIBUTE THAT DIFFERS FROM A CORRESPONDING ATTRIBUTE OF OTHER TRAINING DATA DISTRIBUTIONS OF THE PLURALITY OF TRAINING DATA DISTRIBUTIONS

804

GENERATE, BY THE MACHINE LEARNING MODEL AND BASED ON THE INPUT MATRIX AND THE DOMAIN INDEX MATRIX, AN OUTPUT MATRIX COMPRISING, FOR EACH RESPECTIVE INPUT VALUE OF THE INPUT MATRIX, A CORRESPONDING OUTPUT VALUE GENERATED BASED ON (I) THE RESPECTIVE INPUT VALUE AND (II) THE CORRESPONDING DOMAIN INDEX VALUE SUCH THAT THE CORRESPONDING OUTPUT VALUE EXHIBITS THE ATTRIBUTE OF THE CORRESPONDING TRAINING DATA DISTRIBUTION

GENERATION OF MACHINE LEARNING OUTPUTS USING A DOMAIN INDEX MATRIX TO CONTROL A RELATIVE CONTRIBUTION OF MULTIPLE DIFFERENT TRAINING DATA SETS

CROSS-REFERENCE TO RELATED APPLICATIONS

The present application is a National Stage Application under 35 U.S.C. § 371 and claims priority to International Patent Application No. PCT/US2021/043134, filed Jul. 26, 2021, and titled "Generation of Machine Learning Predictions Using Multiple Domain Data Sets," which is incorporated herein by reference in its entirety.

BACKGROUND

Machine learning models may be used to process various types of data, including images, time series, text, and/or point clouds, among other possibilities. Improvements in the machine learning models allow the models to carry out the processing of data faster and/or utilize fewer computing resources for the processing.

SUMMARY

A machine learning model may be trained to perform a particular task using a plurality of training data distributions. The training data distributions may differ from one another, with each training data distribution being associated with different attributes. The machine learning model may be configured to generate an output matrix based on an input matrix and a domain index matrix. The input matrix may represent input data to be processed by the machine learning model as part of performance of the particular task. The domain index matrix may control the extent to which each of the plurality of training data distributions influences the output matrix. Specifically, domain index value(s) of each element of the domain index matrix may control the attributes of one or more corresponding output values of the output matrix. Accordingly, attributes of the output matrix may be varied by varying the domain index values of the domain index matrix, with the possible range of attributes being based on the plurality of training data distributions.

In a first example embodiment, a method may include obtaining an input matrix representing input data. The method may also include determining a domain index matrix that includes, for each respective input value of the input matrix, a corresponding domain index value that indicates a corresponding training data distribution to be used in generating an output value corresponding to the respective input value. The corresponding training data distribution may be one of a plurality of training data distributions. The method may additionally include providing the input matrix and the domain index matrix to a machine learning model that has been trained to generate output matrices using the plurality of training data distributions. Each respective training data distribution of the plurality of training data distributions may be associated with an attribute that differs from a corresponding attribute of other training data distributions of the plurality of training data distributions. The method may further include generating, by the machine learning model and based on the input matrix and the domain index matrix, an output matrix that includes, for each respective input value of the input matrix, a corresponding output value generated based on (i) the respective input value and (ii) the corresponding domain index value such that the corresponding output value exhibits the attribute of the corresponding training data distribution.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 is a flow chart, in accordance with examples described herein.

DETAILED DESCRIPTION

Figure 1:
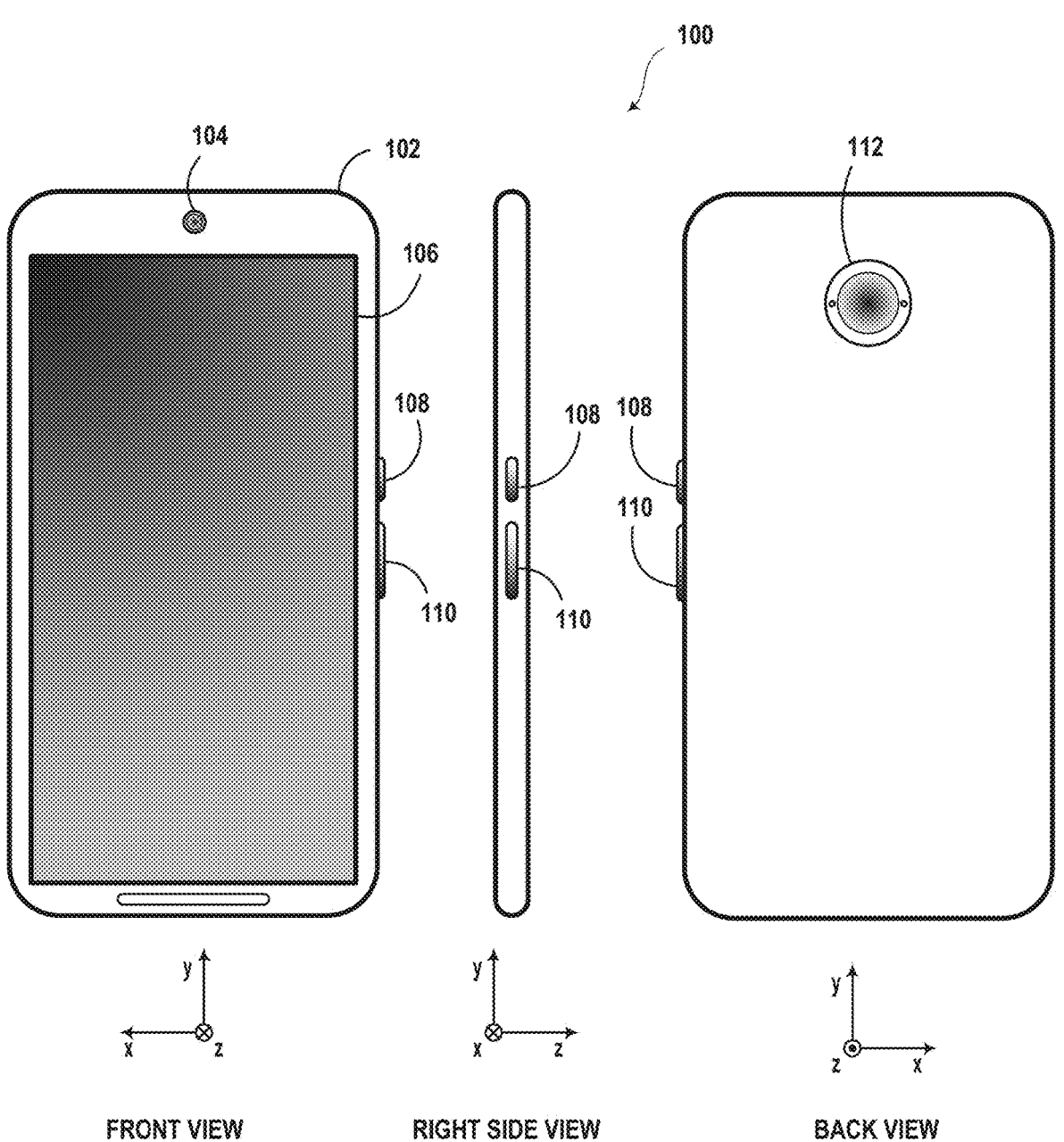
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

A machine learning model may be trained to perform a task using a corresponding training data set (i.e., training data distribution) that includes a plurality of pairs of training input and corresponding ground-truth output. In some cases, a plurality of different training data sets may be available for a given task, and the attributes of the training data sets may differ from one another. For example, a first training data set may include accurate ground-truth data for one or more first conditions associated with the task, while a second training data set may include ground-truth data that is inaccurate for the one or more first conditions but is accurate for one or more second conditions. This difference among the training data sets may be the result of various practical constraints associated with obtaining accurate ground-truth data, including properties of sensors used in generating the training data, properties of algorithms used in processing the sensor data and/or generating the training data, differences among manual annotators of the training data, and/or frequency of occurrence of different conditions represented by the training data, among other possible factors.

Training a machine learning model using a union of multiple training data sets, without explicitly distinguishing thereamong, may result in the machine learning model learning to generate an output that approximates an average of the ground-truth of these training data sets. However, when the ground-truth for a given condition differs among the training data sets, the average result may be inaccurate, resulting in a machine learning model that generates inaccurate results under some conditions. Accordingly, a machine learning model may instead be trained to allow a domain index matrix to be used, at inference time, to explicitly indicate one or more training data sets (based on which the machine learning model has previously been trained) that the machine learning model is to use in generating output data. Specifically, during training, the machine learning model may be informed of the training data set from which a corresponding training sample is obtained. Thus, at inference time, the machine learning model may be configured to generate outputs having the same attributes as the training data set(s) specified by the domain index matrix.

Specifically, the domain index matrix may include a plurality of elements, each of which may be associated with one or more domain index values. The one or more domain index values of a particular element may include, for example, a number of values that is equal to a number of different training data distributions used in training the machine learning model. Each matrix element of the domain index matrix, and thus its corresponding one or more domain index values, may correspond to one or more input values of an input matrix. For example, the domain index values of a given matrix element of the domain index matrix may control the manner in which, for example, one, two, four, eight, or sixteen corresponding elements of the input matrix are processed to generate corresponding output values of an output matrix. Thus, the one or more domain index values may indicate, to the machine learning model, which one or more training data distributions are to be modeled and/or imitated in generating output values based on the one or more input values. Accordingly, attributes of the output matrix may be controlled per-pixel and/or per-pixel-group by specifying, using the domain index matrix, the extent to which different training data distributions are to influence a given pixel and/or a given pixel group of the output matrix.

In some implementations, the machine learning model may be trained in combination with a domain detection model. The domain detection model may be used during the training process to determine, based on a training input matrix and a ground-truth domain index matrix, a training domain index matrix. The machine learning model may be used to generate a training output matrix based on the training domain index matrix and a corresponding training input matrix. Training of the machine learning model using the training domain index matrix may allow the machine learning model to learn to better deal with noise, to aggregate information from different training data distributions, and/or to generate outputs that blend the attributes of different training data distributions.

Further, the machine learning model may, as a result of the training, be configured to generate, based on a single input matrix, a plurality of different output matrices, each associated with a corresponding domain index matrix. Accordingly, a single machine learning model may be controlled to deterministically generate outputs having different attributes by adjusting values of the domain index matrix, rather than by retraining the machine learning model. Additionally, the machine learning model may be smaller, and thus more computationally efficient (e.g., faster to train, retrieve from memory, and/or execute), than a sum of multiple machine learning models that have been independently trained using corresponding training data distributions. Further, since the machine learning model aggregates information from across multiple different training data distributions, the machine learning model may generate predictions that are more accurate and/or otherwise of higher quality than any individual independently-trained model. The machine learning model may therefore be stored in a portion of a memory that is smaller than a portion of memory required to store the multiple machine learning models, but may nevertheless provide improved predictions relative to the individual independently-trained model. The machine learning model may therefore be able to be deployed on devices where memory is restricted such that the devices are not able to deploy individual independently-trained models.

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic, stereoscopic, or multiscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving computing device 100 a predetermined distance, or according to a predetermined capture schedule.

Figure 2:
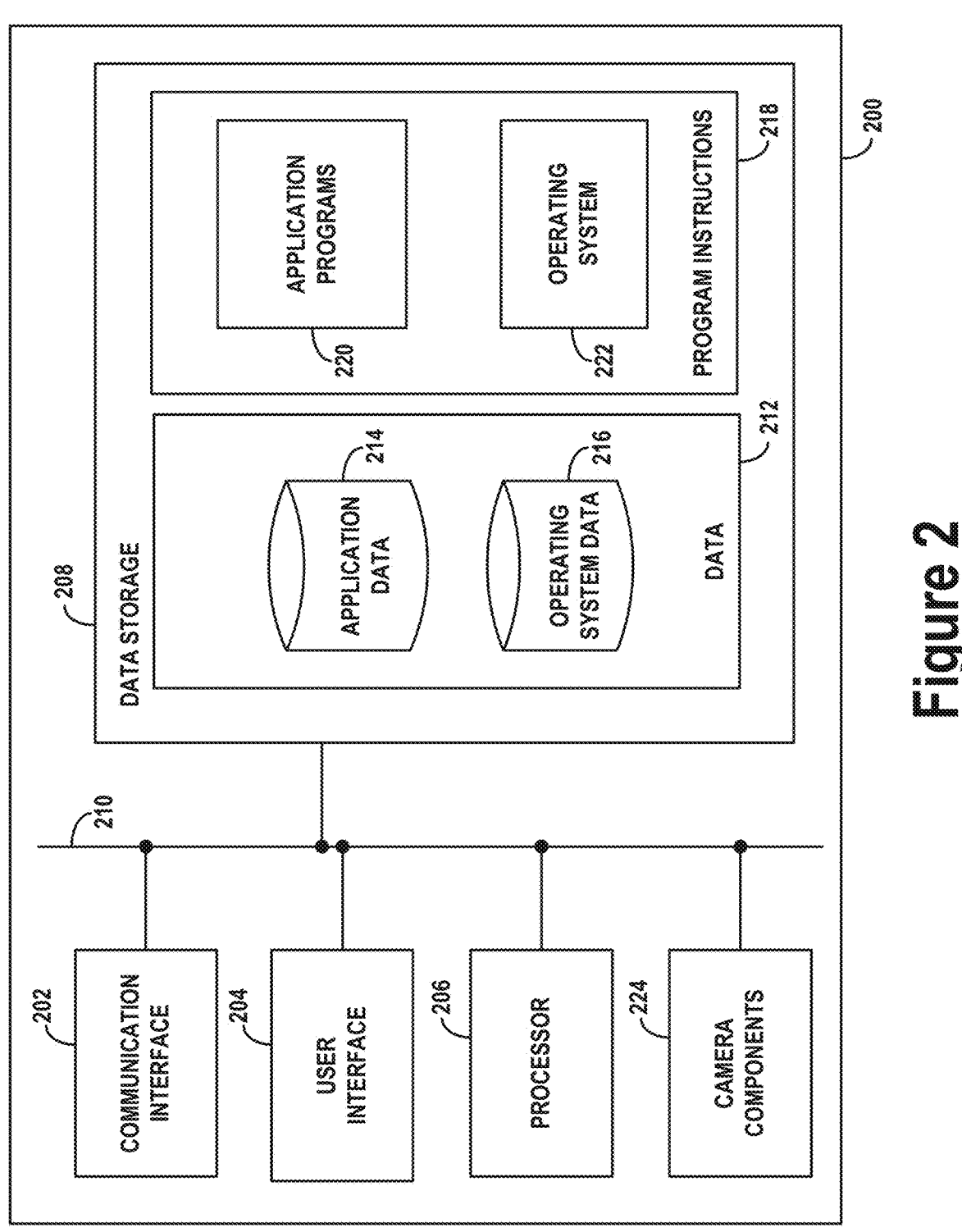
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen, which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and/or components configured for capturing of images in the infrared light spectrum (e.g., electromagnetic radiation having a wavelength of 701 nanometers-1 millimeter), among other possibilities. Camera components 224 may be controlled at least in part by software executed by processor 206.

III. EXAMPLE TRAINING DATA DISTRIBUTIONS

Figure 3:
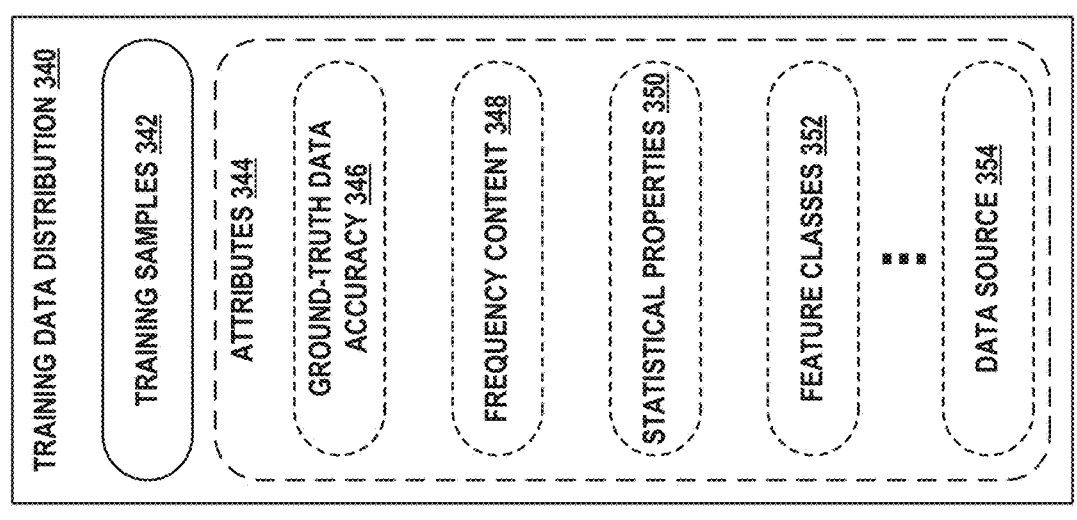
FIG. 3 illustrates training data distributions, in accordance with examples described herein.
Figure 3:
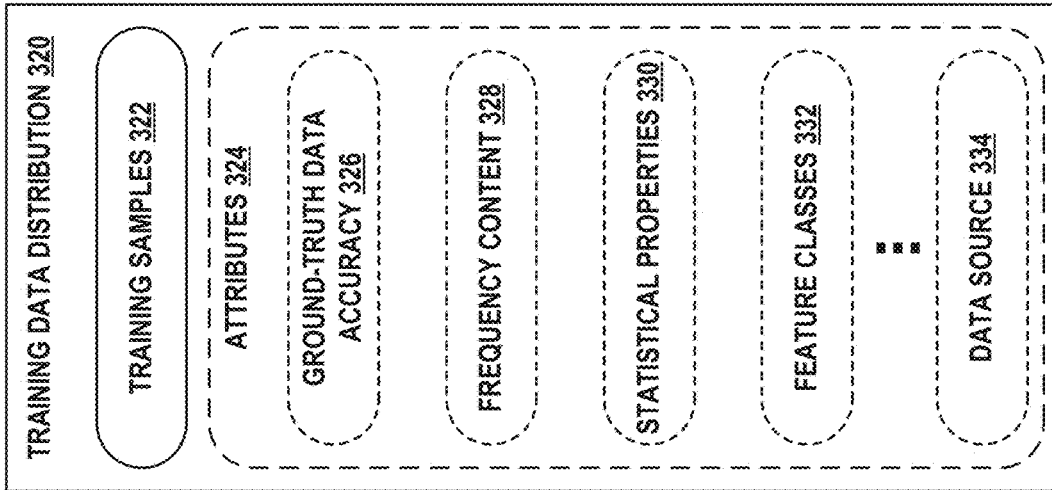
Figure 3:
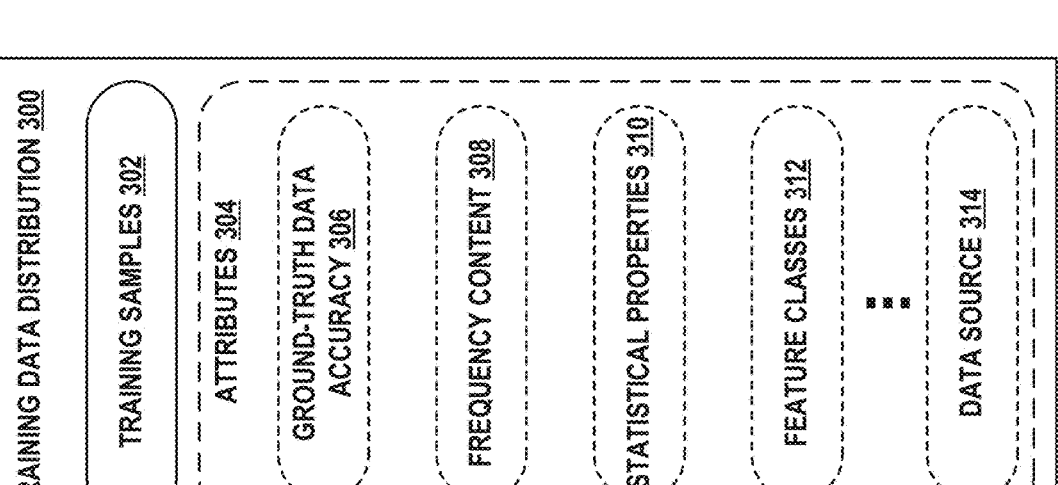

FIG. 3 illustrates a plurality of training data distributions, each of which may be used to train a machine learning model to perform a particular task. Specifically, FIG. 3 includes training data distribution 300, training data distribution 320, and training data distribution 340, which may be collectively referred to as training data distributions 300-340. Each training data distribution may include a corresponding plurality of training samples. Specifically, training data distribution 300 may include training samples 302, training data distribution 320 may include training samples 322, and training data distribution 340 may include training samples 342. Each respective training sample of training samples 302, 322, and 342 may include a corresponding training input and a corresponding ground-truth output.

Training data distributions 300-340 may differ from one another in one or more attributes. Specifically, training data distribution 300 may be associated with attributes 304, training data distribution 320 may be associated with attributes 324, and training data distribution 340 may be associated with attributes 344. In some cases, attributes 304, 324, and 344 may be explicitly represented and/or indicated as part of the respective training data distributions. In other cases, attributes 304, 324, and 344 may instead be inherently present as part of training samples 302, 322, and 342, respectively, but might not be explicitly represented and/or indicated. Thus, attributes 304, 324, and 344 are indicated with dashed lines.

Attributes 304 may include, for example, ground-truth data accuracy 306, frequency content 308, statistical properties 310, feature classes 312, and data source 314, among other possibilities. Similarly, attributes 324 may include ground-truth data accuracy 326, frequency content 328, statistical properties 330, feature classes 332, and data source 334, while attributes 344 may include ground-truth data accuracy 346, frequency content 348, statistical properties 350, feature classes 352, and data source 354.

Ground-truth data accuracy 306 may indicate an accuracy, or extent of correctness, of the ground-truth data represented by samples 302. In some cases, ground-truth data accuracy 306 may vary based on and/or as a function of one or more of the other attributes. Frequency content 308 may indicate the frequencies represented by the corresponding training inputs and/or ground-truth outputs represented by training samples 302. In one example, when training samples 302 represent image data, frequency content 308 may represent a spatial frequency content present in the image data. In another example, when training samples 302 represent audio data, frequency content 308 may represent an audio frequency content.

Statistical properties 310 may indicate one or more statistical properties of the corresponding training inputs and/or ground-truth outputs represented by training samples 302. Statistical properties 310 may include a mean, median, mode, range, variance, and/or standard deviation, among others, of various aspects of samples 302. Feature classes 312 may indicate one or more classifications represented by training samples 302 of features present in training samples 302. The features may include, for example, objects, sounds, words, and/or patterns thereof, and may depend on the type of data (e.g., image, audio, text, etc.) represented by training samples 302. Data source 314 may indicate a source from which training samples 302 were obtained and/or by which training samples 302 were generated. Data source 314 may indicate, for example, a type of sensor involved in generating samples 302, an algorithm involved in generating samples 302, and/or a unique identifier associated with training data distribution 300, among other possibilities.

In one example, training data distributions 300, 320, and 340 may allow a machine learning model to learn to generate depth images based on corresponding monoscopic images. Training samples 302, 322, and 342 may each include a plurality of pairs of (i) a respective training monoscopic image (e.g., red-green-blue (RGB) image) and (ii) a corresponding ground-truth depth image. The corresponding ground-truth depth images may have been generated in a respective one of a plurality of ways for each training sample, for example based upon one of a plurality of different input image data that allows determination of depth information and/or by processing the input image data to determine the depth data using one of a plurality of different depth determination algorithms. For example, for training samples 302, the ground-truth depth images may have been generated based on stereoscopic image data and/or disparity data obtained from one or more stereoscopic cameras. For training samples 322, the ground-truth depth images may have been generated based on multi-pixel (e.g., dual-pixel) images generated by one or more multi-pixel cameras. For training samples 342, the ground-truth depth images may have been generated based on processing of a plurality of monoscopic images by another machine learning model, such as the MiDaS model discussed in a paper titled "Towards Robust Monocular Depth Estimation: Mixing Datasets for Zero-shot Cross-dataset Transfer," authored by Ranflt et al., and published as arXiv:1907.01341v3.

Accordingly, training samples 302 may include ground-truth depth images that include high-frequency content, and thus represent the depth of various features in detail. Training samples 302 may also include noise, and may thus inaccurately represent the depth of some portions of the various features. Training samples 322 may include ground-truth images that accurately represent the depth of textured features (e.g., image regions with high-frequency content), but that may be inaccurate for features and/or regions with little to no texture (e.g., image regions with low-frequency content). Training samples 342 may include ground-truth images that are generally accurate but represent the depth at relatively low frequencies, and thus lack high-frequency details.

Thus, each of training data distributions 300, 320, and 340 may be relatively accurate under a first set of circumstances/conditions, and may be relatively less accurate under a second set of circumstances/conditions. A machine learning model trained using training data distribution 300 may generate outputs that exhibit the attributes of training data distribution 300, a machine learning model trained using training data distribution 320 may generate outputs that exhibit the attributes of training data distribution 320, and a machine learning model trained using training data distribution 340 may generate outputs that exhibit the attributes of training data distribution 340.

A machine learning model trained using a combined data set that represents the union of training data distributions 300, 320, and 340 may learn to predict approximately an average of the ground-truth associated with these data distributions. This may be undesirable because, if two training data distributions are significantly different, with one distribution representing an accurate ground-truth output and the other representing an inaccurate ground-truth output, the resulting average may nevertheless be inaccurate. Instead of simply training the machine learning model using the combined data set, the machine learning model may instead be trained to be aware of which distribution a given training sample belongs to, and thus deterministically control the extent to which different portions of the output are based on the different training data distributions.

IV. EXAMPLE SYSTEM WITH DOMAIN SELECTION FOR A MACHINE LEARNING MODEL

Figure 4:
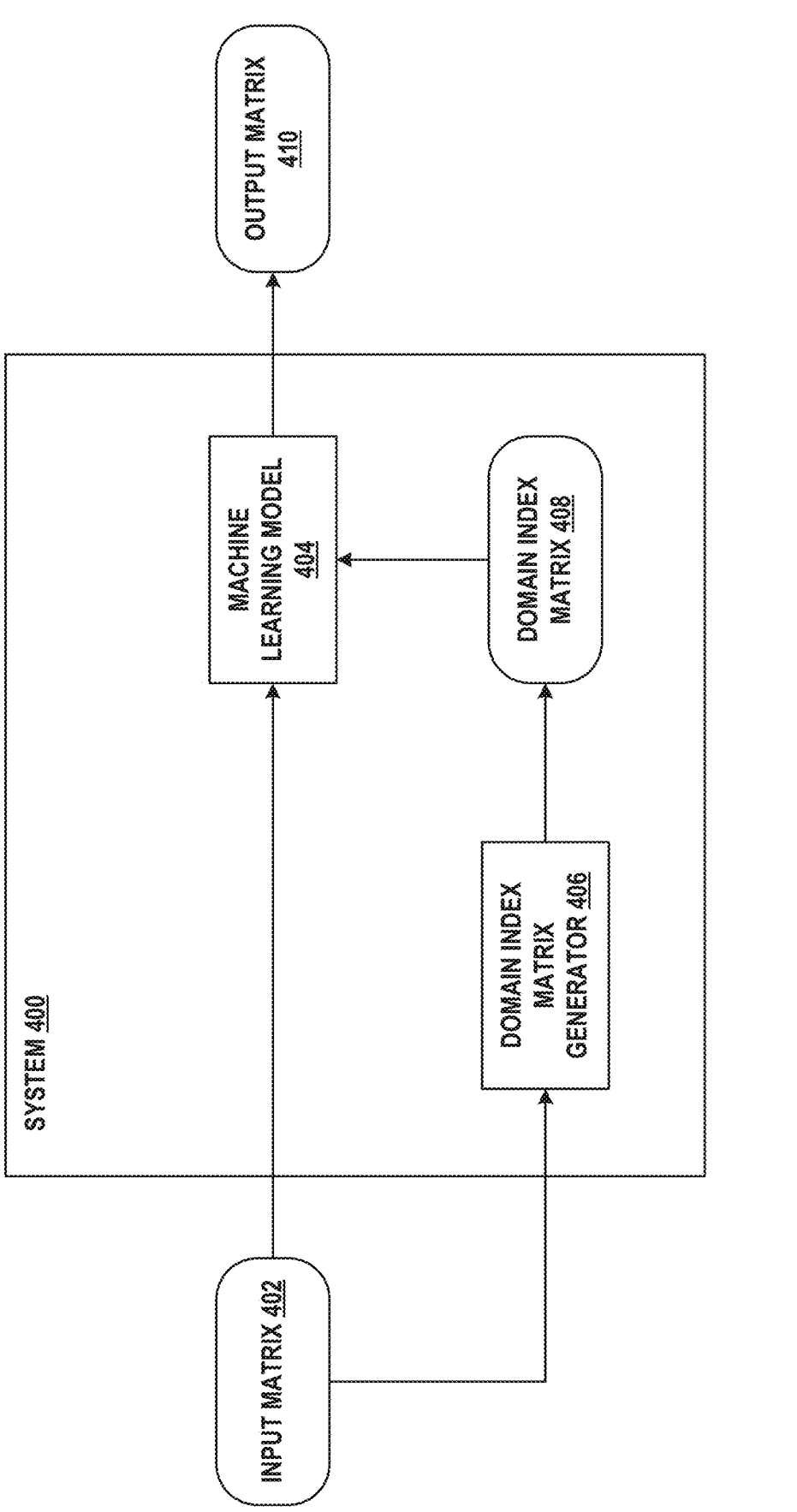
FIG. 4 illustrates a system, in accordance with examples described herein.

FIG. 4 illustrates system 400 that may be configured to allow for control over how multiple different training data distributions are used by a machine learning model to generate an output. Specifically, system 400 may include machine learning model 404 and domain index matrix generator 406. System 400 may be configured to generate output matrix 410 based on input matrix 402. System 400 may be implemented as hardware, as software, or as a combination thereof. For example, system 400 may be implemented by computing device 100 and/or computing system 200.

Input matrix 402 and/or output matrix 410 may represent various types of data including, for example, image, point cloud, text, and/or waveform, among other types of data that may be represented as a matrix. For example, input matrix 402 may represent an input image (for example representing a plurality of values associated with pixels of the input image) while output matrix 410 represents an output image generated based on the input image and including content additional to that of the input image. Input matrix 402 and output matrix 410 may be viewed as representative examples of tensors having a rank of one or higher. For example, matrices 402 and/or 410 may have a dimension of H×1 (i.e., column vector), 1×W (i.e., row vector), H×W (i.e., a matrix, or rank-2 tensor), H×W×D (i.e., a rank-3 tensor), and so on. The dimensions of input matrix 402 and/or output matrix 410 may depend on the type of data represented thereby, an architecture/structure of machine learning model 404, and/or the task being performed by machine learning model 404, among other factors.

Machine learning model 404 may have been trained, using a plurality of training data distributions (e.g., 300, 320, and 340), to generate output matrix 410 based on input matrix 402 and domain index matrix 408. Specifically, domain index matrix 408 may allow for selection of one or more of the plurality of training data distributions to be used in generating different parts of output matrix 410. That is, using domain index matrix 408, machine learning model 404 may be controlled to generate, for example, a first part of output matrix 410 to exhibit the attributes of a first training data distribution and a second part of output matrix 410 to exhibit attributes of a different training data distribution. Each training data distribution of the plurality of training data distributions may be considered to define its own domain, and may thus be identified by and/or associated with a domain index value.

Domain index matrix generator 406 may be configured to generate domain index matrix 408, which may include a plurality of domain index values. Domain index matrix 408 may include, for each respective input value of input matrix 402, a corresponding domain index value that indicates a corresponding training data distribution to be used in generating an output value corresponding to the respective input value. The corresponding training data distribution may be one of the plurality of training data distributions that were used to train machine learning model 404. Each domain index value of domain index matrix 408 may be associated with one or more corresponding input values of input matrix 402. Thus, domain index matrix 408 may control which training data distribution is used in generating output matrix 410 on a per-pixel basis (with one domain index value controlling one corresponding output value) or a per-pixel-group basis (with one domain index value controlling two or more corresponding output values).

In some implementations, the corresponding domain index value may be, for example, a single integer value that indicates a single, corresponding training data distribution. For example, the domain index value may be 1, 2, or 3 used to indicate, respectively, training data distribution 300, 320, or 340. Accordingly, the corresponding domain index value may be used to select a single training data distribution to be used in generating the output value corresponding to the respective input value. For example, when a given element of domain index matrix 408 is assigned a domain index value of 2, machine learning model 404 may be configured to use training data distribution 320, but not training data distributions 300 or 340, to generate output values of output matrix 410 based on input values of input matrix 402 that correspond to the given element of domain index matrix 408.

In other implementations, the corresponding domain index value may include a plurality of domain values, with each respective domain index value of the plurality of domain index values indicating an extent of a corresponding training data distribution to be used in generating the output value corresponding to the respective input value. Thus, each element of domain index matrix 408 may be associated with a plurality of domain index values, rather than a single domain index value. For example, each element of domain index matrix 408 may include a first domain index value, a second domain index value, and a third domain index value used to indicate, respectively, the extent to which training data distributions 300, 320, and 340 are to be used in generating a corresponding output value. Thus, the plurality of domain index values of each element may specify a blending of training data distributions 300, 320, and 340 to be performed by machine learning model 404 in order to generate the output value corresponding to the respective input value.

In some implementations, domain index matrix generator 406 may include a user interface configured to allow a user to specify at least part of domain index matrix 408. For example, the user may, based on a manual inspection of input matrix 402 (e.g., by looking at an image represented by input matrix 402), identify one or more attributes of input matrix 402 and, based on these attributes, specify one or more domain index values for domain index matrix 408. The user may select these domain index values such that training data distributions associated with the one or more attributes and/or with similar attributes are used to generate corresponding portions of output matrix 410. By selecting different sets of domain index values, the user may use machine learning model 404 to generate different output matrices based on a single input matrix without retraining of machine learning model 404.

In other implementations, domain index matrix generator 406 may be configured to automatically determine, based on input matrix 402, one or more attributes of input matrix 402 and, based on these attributes, generate one or more domain index values for domain index matrix 408. For example, domain index matrix generator 406 may be configured to determine and/or approximate a frequency content, statistical properties, feature classes, and/or a data source of input matrix 402. Domain index matrix generator 406 may generate the one or more domain index values such that training data distributions associated with the one or more attributes and/or with similar attributes are used to generate corresponding portions of output matrix 410, while training data distribution with dissimilar attributes are not used to generate the corresponding portions of output matrix 410.

Figure 5:
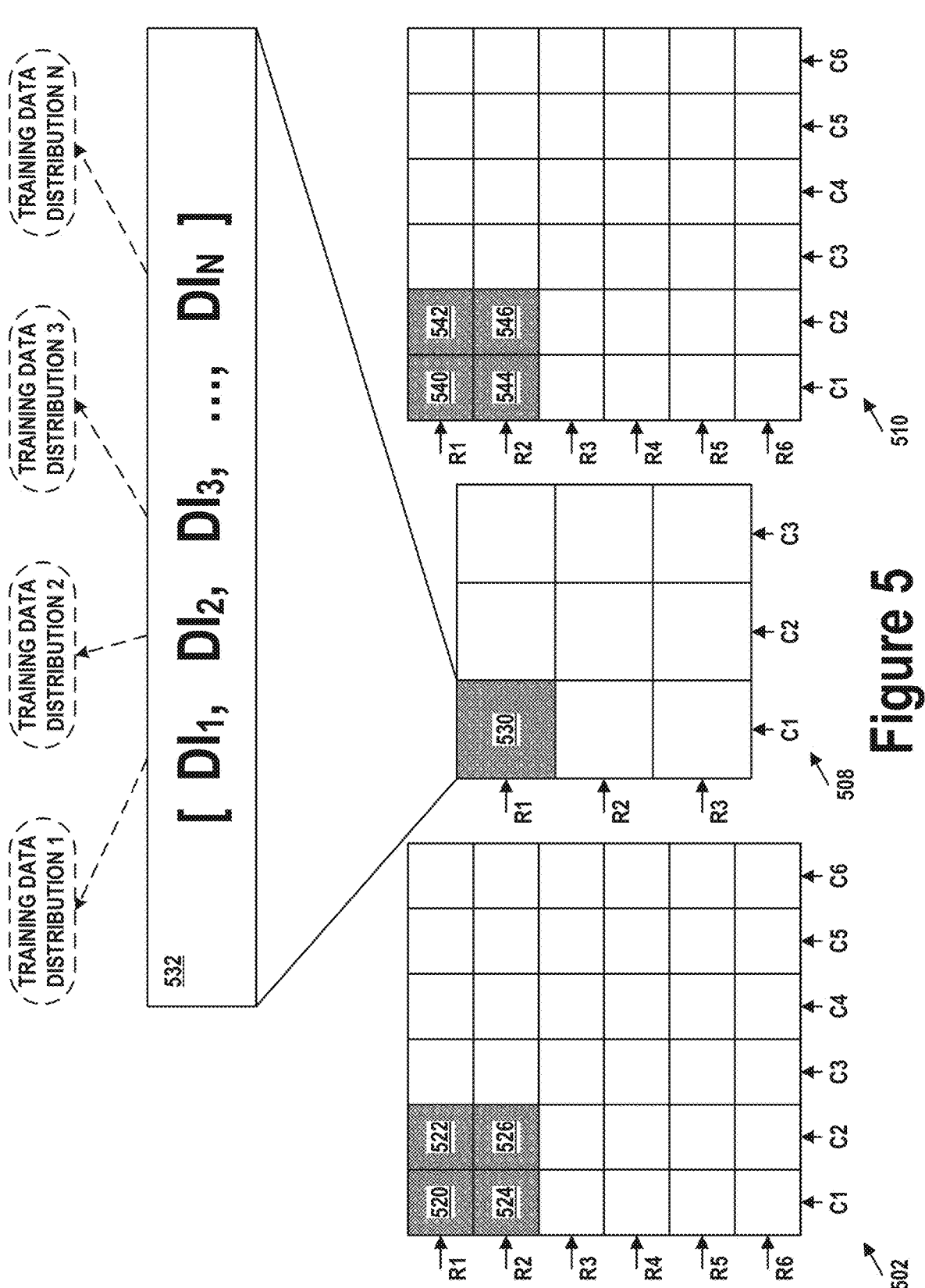
FIG. 5 illustrates aspects of an input matrix, a domain index matrix, and an output matrix, in accordance with examples described herein.

FIG. 5 provides visual examples of input matrix 402, domain index matrix 408, and output matrix 410. Specifically, FIG. 5 includes a 6×6 input matrix 502, which provides an example of input matrix 402, a 3×3 domain index matrix 508, which provides an example of domain index matrix 408, and a 6×6 output matrix 510, which provides an example of output matrix 410. Input matrix 502 includes matrix elements 520, 522, 524, and 526 that have corresponding input values. Output matrix 510 includes matrix elements 540, 542, 544, and 546 that have corresponding output values. Domain index matrix 508 includes matrix element 530 that, in the example shown, includes a plurality of domain index values 532.

In the example shown, each respective element (and its associated domain index value(s)) of domain index matrix 508 maps to four corresponding elements of input matrix 502 and four corresponding elements of output matrix 510, as indicated by the shading of these elements. Specifically, the value(s) of matrix element 530 of domain index matrix 508 indicate to machine learning model 404 which training data distribution(s) are to be used in generating output values of matrix elements 540, 542, 544, and 546 based on the input values of matrix elements 520, 522, 524, and 526. In some implementations, domain index matrix 508 may have a different size in relation to input matrix 502 and/or output matrix 510. Thus, the values of each matrix element of domain index matrix 508 may correspond to fewer (e.g., 1) or more (e.g., 8) matrix elements of input matrix 502 and/or output matrix 510.

Domain index values 532 may include values $DI_1$, $DI_2$, and $DI_3$ through $DI_N$ (i.e., domain index values $DI_1$-$DI_N$), each of which may be associated with a corresponding training data distribution. Specifically, domain index value $DI_1$ may correspond to a first training data distribution (e.g., training data distribution 300), domain index value $DI_2$ may correspond to a second training data distribution (e.g., training data distribution 320), domain index value $DI_3$ may correspond to a third training data distribution (e.g., training data distribution 340), and domain index value $DI_N$ may correspond to an Nth training data distribution.

Each of domain index values $DI_1$-$DI_N$ may be selected from a predetermined range (e.g., $R_{MIN}=0$ to $R_{MAX}=1$), and may thus indicate the extent to which the corresponding training data distribution is to influence the corresponding output values (i.e., the output values of matrix elements 540, 542, 544, and 546). For example, a domain index value of 0 may indicate that the corresponding training data distribution is to be used minimally (e.g., not at all), while a domain index value of 1 may indicate that the corresponding training data distribution is to be used maximally. Thus, a ratio between a first domain index value and a second domain index value may indicate a relative contribution of the respective training data distributions to the output value.

In some implementations, machine learning model 404 may be configured to operate under the condition that domain index values $DI_1$-$DI_N$ sum to a predetermined value $$\left(\text{i.e., } \sum_{i=1}^{N} DI_i = V,\right.$$

where V represents the predetermined value). The predetermined value may be based on the predetermined range. In one example, the predetermined value may be equal to the high end $R_{MAX}$ of the predetermined range. That is, $$\sum_{i=1}^{N} DI_i = V = R_{MAX}$$

(e.g., a predetermined value of 1 may correspond to the range 0 to 1). Thus, multiple domain index values might not be permitted to simultaneously each have a maximum value. In another example, the predetermined value may be selected such that $R_{MAX} < V \leq NR_{MAX}$. Accordingly, a ratio of a given domain index value to the predetermined value $DI_i/V$ may represent a fraction of a total signal of the corresponding output value contributed by the corresponding training data distribution.

In other implementations, machine learning model 404 may be configured to operate independently of the condition that domain index values $DI_1$-$DI_N$ sum to the predetermined value. That is, machine learning model 404 may be configured to generate valid output values for any combination of domain index values $DI_1$-$DI_N$. Accordingly, a ratio of a given domain index value to the sum of the domain index values $$DI_i / \sum_{i=1}^{N} DI_i$$

may represent a fraction of a total signal of the corresponding output value contributed by the corresponding training data distribution.

In some implementations, a dimension of domain index matrix 508 may correspond to a dimension of a latent space of machine learning model 404. For example, machine learning model 404 may include an encoder-decoder architecture, and the latent space may correspond to an output of the encoder that is provided as input to the decoder. Accordingly, domain index matrix 508 may be provided as input to the decoder (along with the latent space representation of input matrix 502), but might not be processed by the encoder. In the example of FIG. 5, the latent space may have a dimension of 3×3, and input matrix 502 may thus be represented as a 3×3 matrix within the latent space. Accordingly, matrix element 530 may correspond to a single matrix element of the latent space representation of input matrix 502, where this single matrix element collectively represents the values of matrix elements 520, 522, 524, and 526. In other implementations, domain index matrix 508 may have the same dimension as input matrix 502, and may thus be provided as an input to, and thus be processed by, the encoder.

V. EXAMPLE TRAINING SYSTEM AND PROCESS

Figure 6:
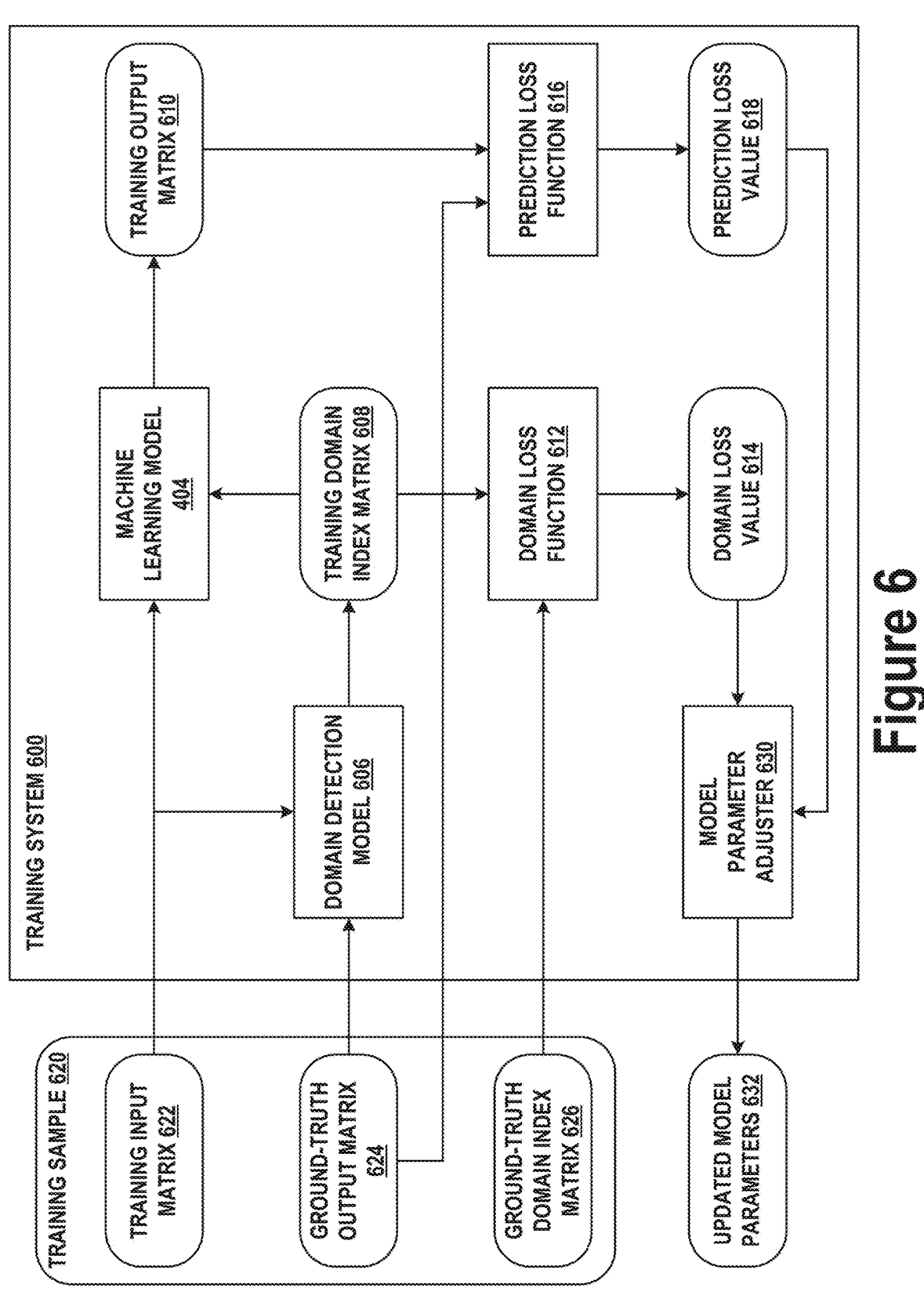
FIG. 6 illustrates a training system, in accordance with examples described herein.

FIG. 6 illustrates an example training system and process for machine learning model 404. Specifically, training system 600 may include machine learning model 404, domain detection model 606, prediction loss function 616, domain loss function 612, and model parameter adjuster 630. Training system 600 may be configured to generate updated model parameters 632 for domain detection model 606 and/or machine learning model 404 based on training sample 620. Training system 600 may be implemented as hardware, as software, or as a combination thereof. For example, training system 600 may be implemented by computing device 100 and/or computing system 200.

Specifically, training sample 620 may include training input matrix 622, ground-truth output matrix 624, and ground-truth domain index matrix 626. In some implementations, ground-truth domain index matrix 626 might not be explicitly provided as part of training sample 620, and may instead be determined by training system 600 based on the corresponding training data distribution from which training sample 620 was selected. Training sample 620 may be a representative example of training samples 302, 322, and/or 342.

Domain detection model 606 may include a machine learning model configured to generate training domain index matrix 608 based on training input matrix 622 and ground-truth output matrix 624. Over the course of training, domain detection model 606 may learn to determine training domain index matrix 608 such that it represents, with increasing accuracy, the training data distribution from which training sample 620 was selected. Domain loss function 612 may be configured to generate domain loss value 614 based on a comparison of training domain index matrix 608 to ground-truth domain index matrix 626. Thus, domain loss function 612 may be configured to quantify an accuracy with which domain detection model 606 identifies the training data distribution from which training sample 620 was selected.

Domain loss function 612 may be expressed as, for example, $$L^{DOMAIN} = \sum_{x} \sum_{i=1}^{N} \left\| DI_i^{TRAINING}(x) - DI_i^{GT}(x) \right\|_2^2,$$

where x is iterated over all elements of ground-truth domain index matrix 626, i is iterated over all domain index values of a given element x, $$DI_i^{TRAINING}(x)$$

represents a particular training domain index value of element x of training domain index matrix 608, and $$DI_i^{GT}(x)$$

represents a corresponding ground-truth domain index value of ground-truth domain index matrix 626. In some implementations, domain loss function 612 may, additionally or alternatively, apply other functions to $$DI_i^{TRAINING}(x)$$

and/or $$DI_i^{GT}(x)$$

such as, for example, a logarithm, an inverse, an exponential, a maximum, a minimum, a scaling, and/or a different norm (e.g., L-1 norm), among other possibilities.

Machine learning model 404 may be configured to determine training output matrix 610 based on training input matrix 622 and training domain index matrix 608. Prediction loss function 616 may be configured to generate prediction loss value 618 based on a comparison of training output matrix 610 to ground-truth output matrix 624. Thus, prediction loss function 616 may be configured to quantify an accuracy with which machine learning model 404 determines ground-truth output matrix 624 based on training input matrix 622 and the output of domain detection model 606.

Prediction loss function 612 may be expressed as, for example, $$L^{PREDICTION} = \sum_y \|O^{TRAINING}(y) - O^{GT}(y)\|_2^2,$$

where y is iterated over all elements of ground-truth output matrix 624, $O^{TRAINING}$ (y) represents a training output value of element y of training output matrix 610, and $O^{GT}$ (y) represents a corresponding ground-truth output value of ground-truth output matrix 624. In some implementations, prediction loss function 612 may, additionally or alternatively, apply other functions to $O^{TRAINING}$ (y) and/or $O^{GT}(y)$ such as, for example, a logarithm, an inverse, an exponential, a maximum, a minimum, a scaling, and/or a different norm (e.g., L-1 norm), among other possibilities. For example, when training output matrix 610 represents a depth image, prediction loss function 616 may implement a scale-invariant depth/disparity loss and/or a shift-invariant depth/disparity loss.

Model parameter adjuster 630 may be configured to determine updated model parameters 632 based on domain loss value 614 and/or prediction loss value 618. Model parameter adjuster 630 may be configured to determine a total loss value based on a weighted sum of these loss values, which may be expressed as $$L^{TOTAL} = L^{DOMAIN} + \alpha L^{PREDICTION},$$

where the value of α represent the relative weight of the corresponding loss values. Updated model parameters 632 may include one or more updated parameters of machine learning model 404 and/or one or more updated parameters of domain detection model 606.

Model parameter adjuster 630 may be configured to determine updated model parameters 632 by, for example, determining a gradient of the total loss function $L^{TOTAL}$. Based on this gradient and the total loss value, model parameter adjuster 630 may be configured to select updated model parameters 632 that are expected to reduce the total loss value, and thus improve performance of models 404 and/or 606. After applying updated model parameters 632 to machine learning model 404 and/or domain detection model 606, another training iteration may be performed to compute another instance of the total loss value and, based thereon, another instance of updated model parameters 632 may be determined and applied to models 404 and/or 606 to further improve the performance thereof. Such training of models 404 and 606 may be repeated until, for example, the total loss value is reduced to below a target threshold loss value.

Domain detection model 606 may be used to assist with training of machine learning model 404, but might not be used at inference time. Instead, as shown in FIG. 4, at inference time, domain detection model 606 may be replaced by domain index matrix generator 406. Specifically, by providing training domain index matrix 608, rather than ground-truth domain index matrix 626, as input to machine learning model 404 at training time, machine learning model 404 may learn to more robustly handle noise, to use information from one training data distribution to improve predictions based on other training data distributions, and/or to combine/blend the attributes of multiple different training data distributions at inference time.

Specifically, ground-truth output matrix 624 may indicate a single corresponding training data distribution $$\left(e.g., DI_1 = 1 \text{ and } \sum_{i=2}^N DI_i = 0\right)$$

to which training sample 620 belongs. Similarly, other ground-truth output matrices may each indicate a single corresponding training data distribution. On the contrary, training domain index matrix 608 may indicate a blend of the different training data distributions (e.g., two or more of $DI_i$-$DI_N$ may be non-zero) because, at least at the start of training, outputs of domain detection model 606 might not be accurate. Over the course of training, the difference between ground-truth domain index matrix 626 and training domain index matrix 608 may decrease, but the two might not converge to exactly the same set of values. This may expose machine learning model 404 to various combinations of values $DI_1$-$DI_N$, some of which may represent noise, while others may represent valid combinations of training data distributions.

Thus, machine learning model 404 may learn to predict a relatively accurate training output matrix 610 in the presence of noise and/or based on multiple different training data distributions. For example, where part of training output 610 may be correctly generated using more than one underlying training data distribution, this training architecture may allow machine learning model 404 to learn to combine information from both training data distributions to generate the relevant part of training output matrix 610. Accordingly, when trained on three different training data distributions, machine learning model 404 may perform more accurately and/or may have a smaller size than three separate models, each of which has been independently trained on a corresponding data distribution. Additionally, machine learning model 404 may be configured to generate, for a given input, a continuous range of outputs representing varying combinations of the three underlying data sets, rather than generating only three discrete outputs as may be the case for the three independently trained models.

Machine learning model 404 may be stored in a portion of a memory. The portion of the memory may be relatively small compared to a portion of memory required to store independently trained models. The portion of the memory may, for example, be a portion of a memory of a device having limited memory. The limited memory of the device may be such that storing and executing independently trained models may be difficult or not possible. That is, the machine learning model 404 may be able to be deployed on a device that is unable to effectively deploy independently trained models. The device may, for example, be a mobile computing device.

VI. EXAMPLE APPLICATIONS OF THE MACHINE LEARNING MODEL

FIGS. 7A, 7B, 7C, 7D, and 7E represent aspects of an application of machine learning model 404 to the task of generating depth images based on monoscopic/monocular images. Specifically, FIG. 7A includes image 700 of a scene that includes grass and a leaf. Region 702 includes a relatively high-frequency texture while region 704 includes a relatively low-frequency texture. Due to the differences in frequency content in regions 702 and 704, different training data distributions may lead to different levels of accuracy in depth predictions for these regions.

Figure 7A:
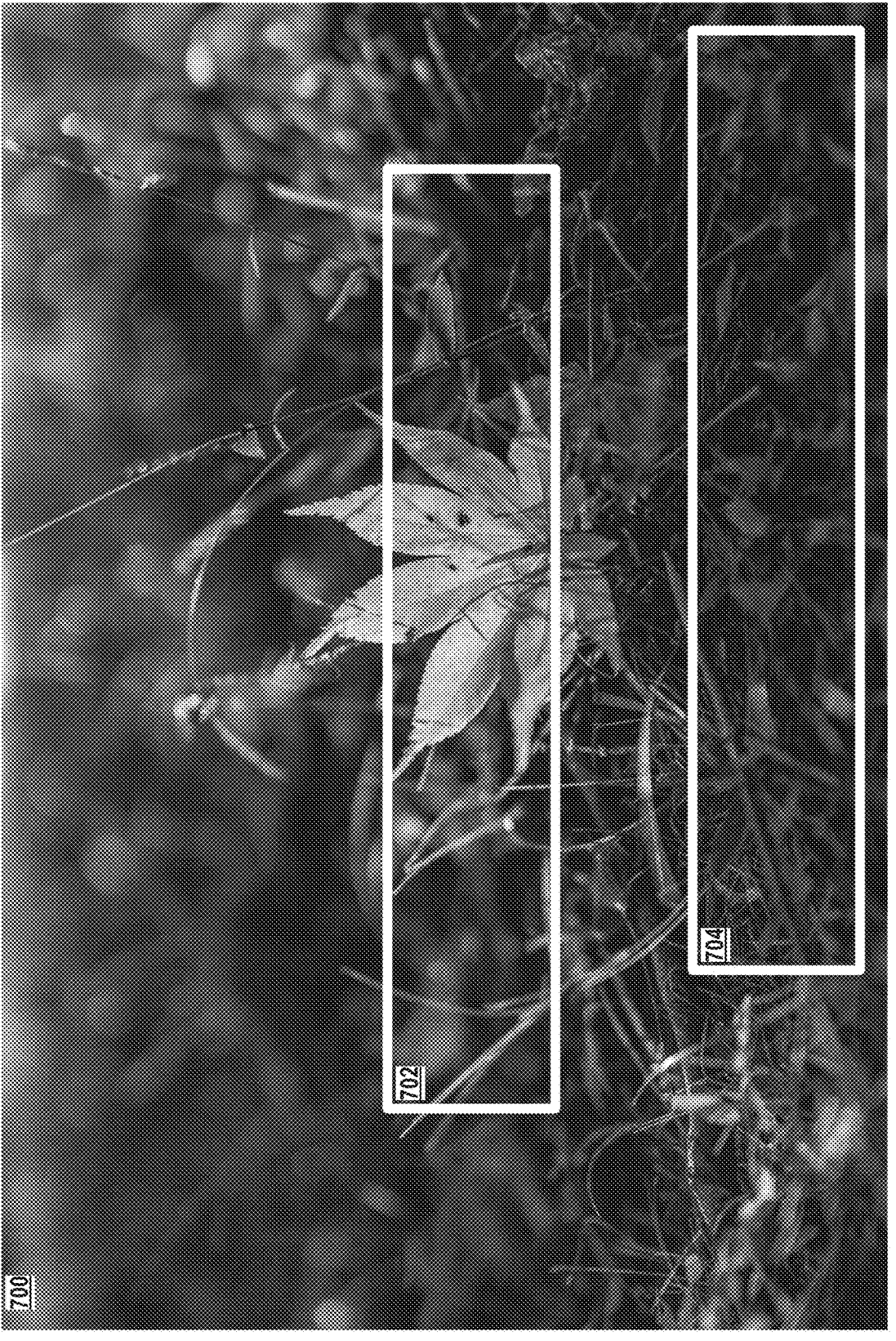
FIG. 7A illustrates an image, in accordance with examples described herein.
Figure 7B:
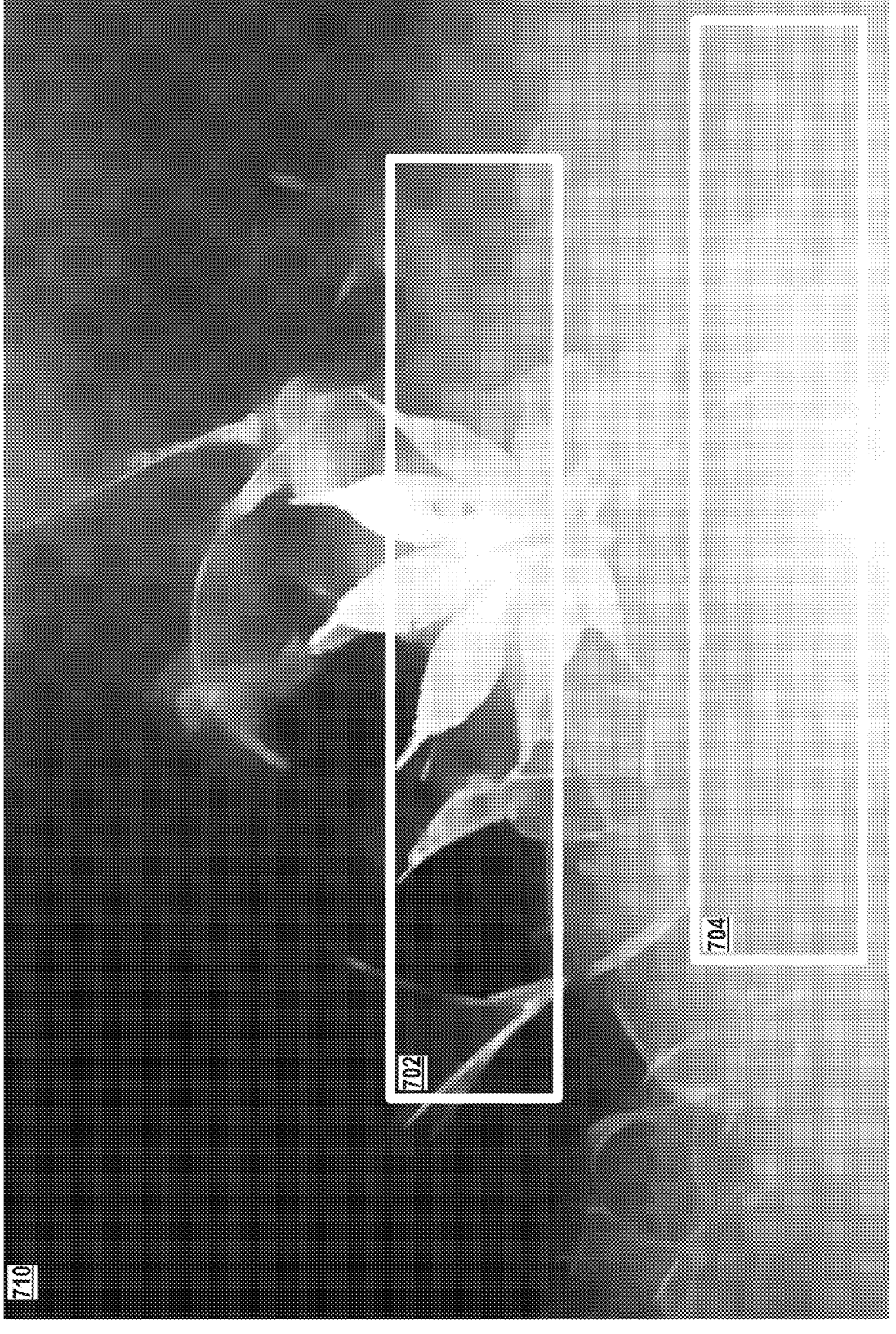
FIGS. 7B, 7C, 7D, and 7E illustrate depth images, in accordance with examples described herein.

Specifically, FIG. 7B includes depth image 710 generated based on image 700 by a machine learning model that has been trained exclusively using a training data distribution (e.g., 300) having ground-truth depth images that were generated based on stereoscopic image data and/or disparity data obtained from a plurality of pairs of stereoscopic cameras. Depth image 710 has a relatively high spatial frequency content. Additionally, the depth values represented by depth image 710 are generally accurate for most parts of image 700, but depth image 710 includes a relatively small number of pixels (e.g., less than 5% of image 710) with incorrect depth values that differ significantly from the actual depth values. That is, depth image 710 may be detailed but noisy.

Figure 7C:
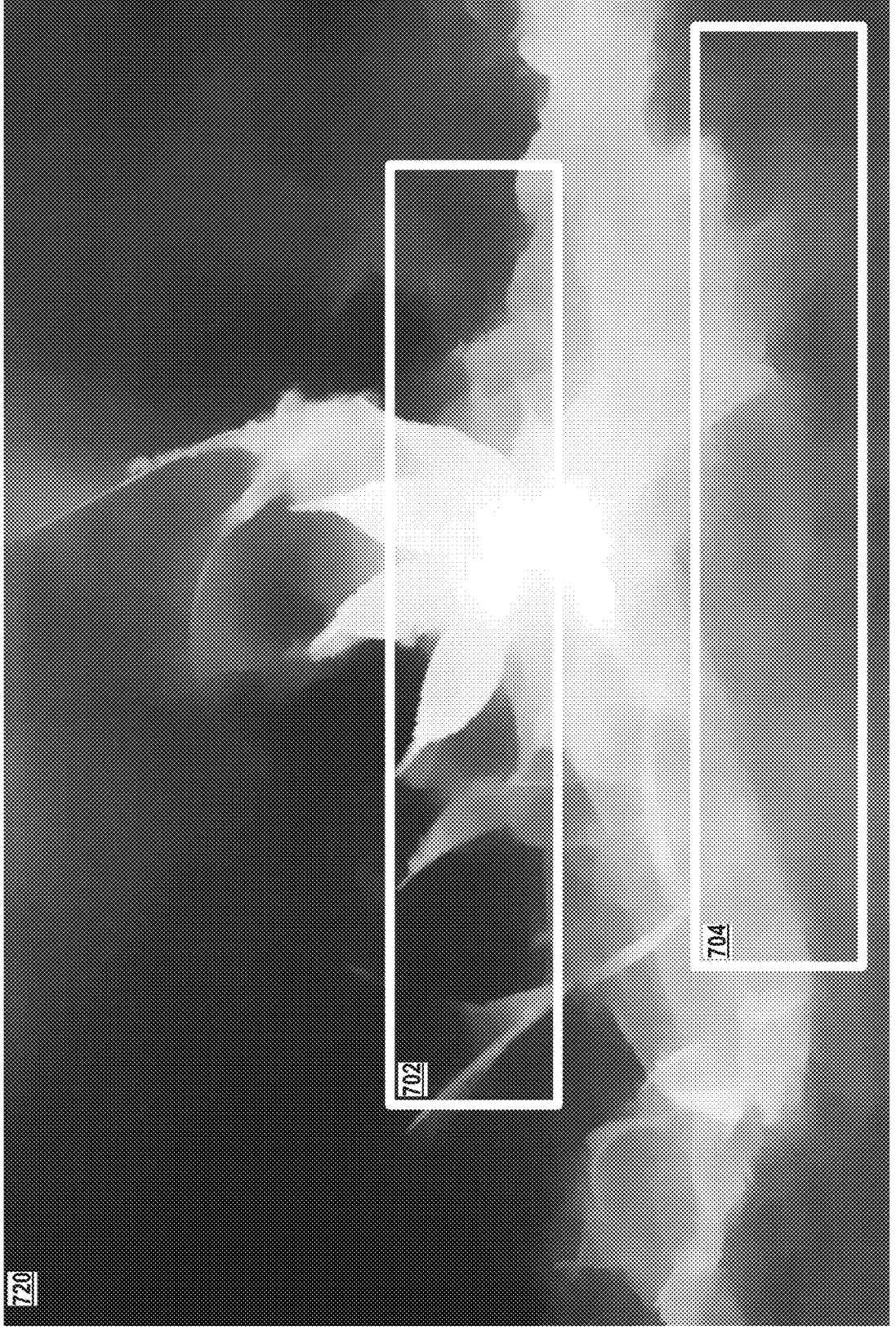

FIG. 7C includes depth image 720 generated based on image 700 by a machine learning model that has been trained exclusively using a training data distribution (e.g., 320) having ground-truth depth images that were generated based on multi-pixel (e.g., dual-pixel) images generated by one or more multi-pixel cameras. Depth image 720 may include accurate depth values in regions that have discernable texture, but may include erroneous depth values in regions that lack discernable texture. Thus, depth values in region 702 of depth image 720 may be more accurate (e.g., due to this region being in-focus) than depth values in region 704 of image 720 (e.g., due to this region being out-of-focus). Depth image 720 may include less detail and less noise than depth image 710, and may be inaccurate in low-frequency (e.g., non-textured) regions.

Figure 7D:

FIG. 7D includes depth image 730 generated based on image 700 by a machine learning model that has been trained exclusively using a training data distribution (e.g., 340) having ground-truth depth images that were generated by processing a plurality of monoscopic images by the MiDaS model/algorithm. Depth image 730 may include depth values that are generally accurate regardless of the underlying spatial frequency content in image 700, but the depth values might not represent high frequencies. Thus, depth values in region 704 of depth image 730 may be more accurate than corresponding depth values in region 704 of image 720, and depth values in region 702 of depth image

730 may represent less detail than corresponding depth values in region 702 of image 720. Depth image 730 may include less detail and less noise than depth image 710.

Figure 7E:
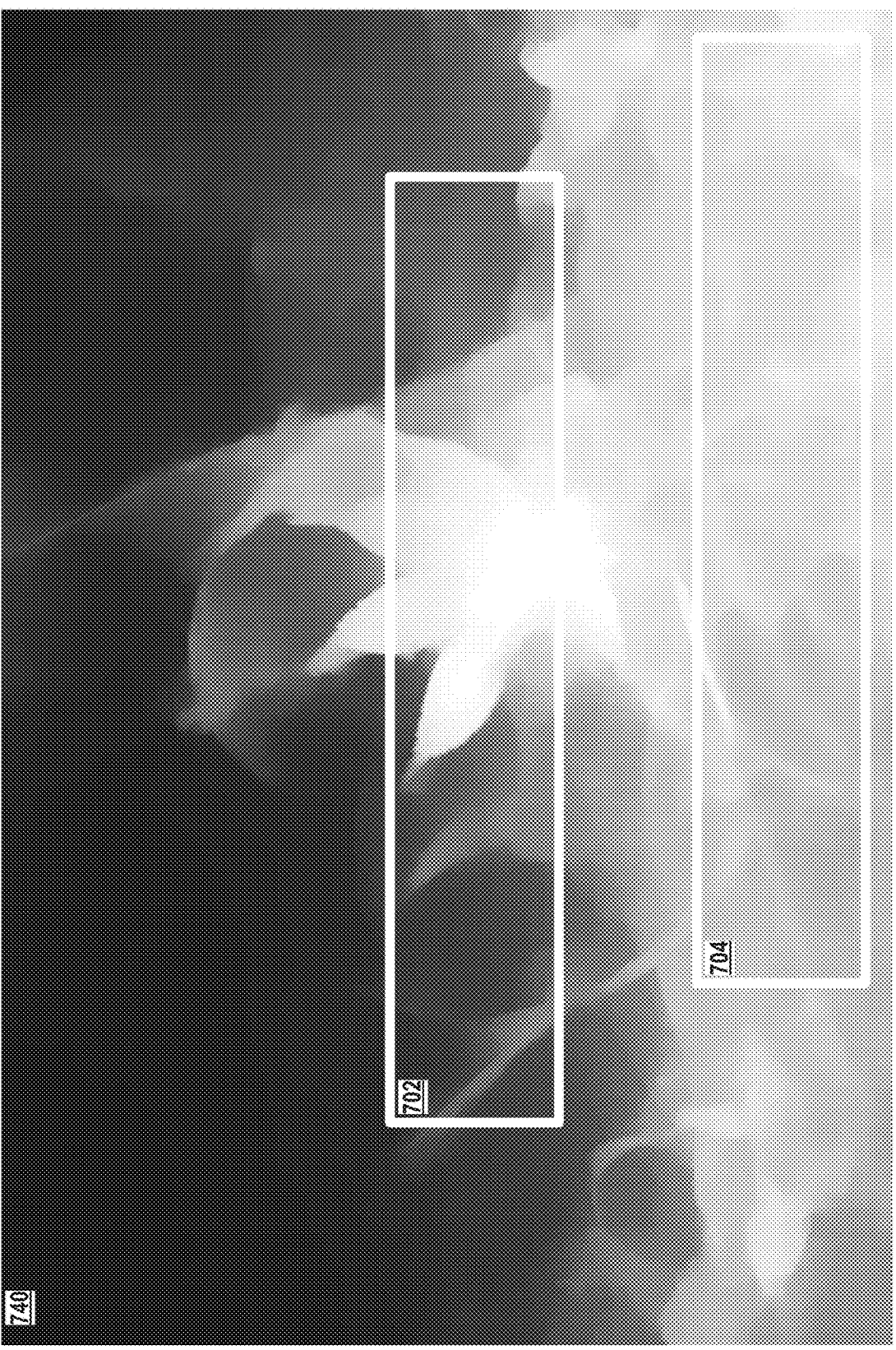

FIG. 7E includes depth image 740 generated based on image 700 by machine learning model 404 that has been trained by training system 600 using each of the three training data distributions associated with FIGS. 7B, 7C, and 7D. Specifically, depth image 740 may be generated by blending information from the three training data distributions in a spatially-varying manner based on the spatial frequency content of different parts of image 700. For example, domain index generator 406 may implement the following functions to generate domain index matrix 408 used in determining depth image 740: $\beta = \sqrt{\text{clip}(g/\lambda, 0.0, 1.0)}$, where $g = \text{gradient}(\text{image } \mathbf{700})$, g represents the spatial frequency content of image 700, $\lambda$ is a modifiable scaling factor ($\lambda = 0.45$ in the example shown), and the clip( ) function is configured to scale $g/\lambda$ to the interval [0.0, 1.0]. Further, domain index generator 406 may be configured to assign the domain index value according to $DI_1 = \beta/2$, $DI_2 = \beta/2$, and $DI_3 = 1.0 - \beta$.

Thus, portions of depth image 740 corresponding to high frequency portions of image 700 may be generated primarily and equally based on the training data distributions of FIGS. 7B and 7C, while portions of depth image 740 corresponding to low frequency portions of image 700 may be generated primarily based on the training data distribution of FIG. 7D, with intermediate frequencies containing a blending of all three training data sets. The value of $\lambda$ and/or the functions used in computing $DI_1$, $DI_2$, and/or $DI_3$ based on $\beta$ may be varied to generate a depth image that includes a desired blending of the attributes of the different training data sets. In other implementations, domain index generator 406 may, additionally or alternatively, be configured to quantify other attributes of input matrix 402 and, based thereon, select a corresponding blending of the underlying training data distributions.

VII. ADDITIONAL EXAMPLE OPERATIONS

FIG. 8 illustrates a flow chart of operations related to generating, by a machine learning model, output data while deterministically selecting the training data distribution on which the output data is based. The operations may be carried out by computing device 100, computing system 200, system 400, and/or training system 600, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining an input matrix representing input data.

Block 802 may involve determining a domain index matrix that includes, for each respective input value of the input matrix, a corresponding domain index value that indicates a corresponding training data distribution to be used in generating an output value corresponding to the respective input value. The corresponding training data distribution may be one of a plurality of training data distributions.

Block 804 may involve providing the input matrix and the domain index matrix to a machine learning model that has been trained to generate output matrices using the plurality of training data distributions. Each respective training data distribution of the plurality of training data distributions may be associated with an attribute that differs from a corresponding attribute of other training data distributions of the plurality of training data distributions.

Block 806 may involve generating, by the machine learning model and based on the input matrix and the domain index matrix, an output matrix that includes, for each respective input value of the input matrix, a corresponding output value generated based on (i) the respective input value and (ii) the corresponding domain index value such that the corresponding output value exhibits the attribute of the corresponding training data distribution.

In some embodiments, the attribute of each respective training data distribution may include an accuracy of ground-truth data associated with one or more conditions represented by the respective training data distribution. The accuracy of the ground-truth data may vary across the plurality of training data distributions as a function of the one or more conditions.

In some embodiments, the one or more conditions represented by the respective training data distribution may include one or more of: (i) frequency content of the ground-truth data, (ii) frequency content of training inputs corresponding to the ground-truth data, (iii) a statistical property of the ground-truth data, or (iv) a statistical property of the training inputs.

In some embodiments, the attribute of each respective training data distribution may include one or more classifications of features of the input data that are represented by the respective training data distribution. The one or more classification may be a subset of a plurality of possible classifications of features of the input data. The plurality of possible classifications may be represented by the plurality of training data distributions.

In some embodiments, the corresponding domain index value may include a plurality of domain index values. Each respective domain index value of the plurality of domain index values may be selected from a predefined range and may indicate an extent of a corresponding training data distribution to be used in generating the output value corresponding to the respective input value. The corresponding training data distribution of each respective domain index value may be one of the plurality of training data distributions.

In some embodiments, a number of domain index values in the plurality of domain index values may be equal to a number of training distributions in the plurality of training distributions.

In some embodiments, a sum of the plurality of domain index values corresponding to the respective input value may be equal to a predetermined value. Each respective domain index value may indicate a fraction of a total signal of the corresponding output value contributed by the corresponding training data distribution.

In some embodiments, the machine learning model may have been trained using a training process that includes obtaining a training sample including a training input matrix and a ground-truth output matrix. The training process may also include determining, for the training sample, a training domain index matrix that includes, for each respective training input value of the training input matrix, a corresponding training domain index value that indicates a corresponding training data distribution (i) to be used in generating a training output value corresponding to the respective training input value and (ii) to which the training sample belongs. The training process may additionally include providing, to the machine learning model, the training input matrix and the training domain index matrix, and generating, by the machine learning model and based on the training input matrix and the training domain index matrix, a training output matrix that includes, for each respective training input value of the training input matrix, a corresponding training output value generated based on (i) the respective training input value and (ii) the corresponding training domain index value. The training process may further include determining a prediction loss value using a prediction loss function configured to compare the training input matrix and the training output matrix, and adjusting one or more parameters of the machine learning model based on the prediction loss value.

In some embodiments, determining the training domain index matrix may include determining the corresponding training data distribution to which the training sample belongs, and assigning, for each respective training input value of the training input matrix, a training domain index value associated with the corresponding training data distribution to which the training sample belongs.

In some embodiments, the training sample may further include a ground-truth domain index matrix that indicates the respective training data distribution to which the training sample belongs. The training process may also include determining the training domain index matrix by a domain detection model and based on the corresponding training input matrix and the corresponding ground-truth output matrix of the respective training sample. The training process may further include determining a domain loss value using a domain loss function configured to compare the training domain index matrix and the ground-truth domain index matrix and, based on the prediction loss value, adjusting one or more parameters of at least one of (i) the machine learning model or (ii) the domain detection model.

In some embodiments, the input matrix may include an input image. The output matrix may include an output image that represents one or more of: (i) a bounding box associated with an object represented by the input image, (ii) a segmentation map of the object represented by the input image, (iii) one or more coordinates associated with the object represented by the input image, or (iv) a representation of a pose of the object represented by the input image.

In some embodiments, the input matrix may include an image, and the output matrix may include a depth map. The plurality of training data distributions may include a first training data distribution generated based on a plurality of stereoscopic images, a second training data distribution generated based on a plurality of multi-pixel images, and a third training data distribution generated based on processing of a plurality of monoscopic images by another machine learning model.

In some embodiments, determining the domain index matrix may include determining, based on the input matrix and for each respective input value thereof, a corresponding attribute value of a particular attribute of the plurality of training data distributions, and determining, for each respective input value of the input matrix, the corresponding domain index value based on the corresponding attribute value.

In some embodiments, determining the domain index matrix may include providing a user interface configured to allow for definition of the domain index matrix, and receiving, by way of the user interface, a definition of at least part of the domain index matrix.

In some embodiments, a second domain index matrix that differs from the domain index matrix may be determined. The input matrix and the second domain index matrix may be provided to the machine learning model. The machine learning model may, based on the input matrix and the second domain index matrix, generate a second output matrix that differs from the output matrix.

In some embodiments, the input matrix and the output matrix may each have a first dimension, and the domain index matrix may have a second dimension that is smaller than the first dimension and corresponds to a latent space of the machine learning model. Generating the output matrix may include generating a latent space representation of the input matrix. A given domain index value may correspond to (i) a plurality of input values of the input matrix as represented at the first dimension and (ii) a single latent space value that represents, at the second dimension, the plurality of input values as part of the latent space representation of the input matrix.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
obtaining an input matrix representing input data;
determining a plurality of domain index values comprising, for each respective input value of the input matrix, a corresponding domain index value that indicates a corresponding training data distribution to be used in generating an output value corresponding to the respective input value, wherein the corresponding training data distribution is one of a plurality of training data distributions;
determining a domain index matrix comprising the plurality of domain index values;
providing the input matrix and the domain index matrix to a machine learning model that has been trained to generate output matrices using the plurality of training data distributions, wherein each respective training data distribution of the plurality of training data distributions is associated with an attribute that differs from a corresponding attribute of other training data distributions of the plurality of training data distributions; and
generating, by an inference operation of the machine learning model and based on the input matrix and the domain index matrix, an output matrix comprising, for each respective input value of the input matrix, the corresponding output value generated based on (i) the respective input value and (ii) the corresponding domain index value such that the corresponding output value exhibits the attribute of the corresponding training data distribution.

2. The computer-implemented method of claim 1, wherein the attribute of each respective training data distribution comprises an accuracy of ground-truth data associated with one or more conditions represented by the respective training data distribution, and wherein the accuracy of the ground-truth data varies across the plurality of training data distributions as a function of the one or more conditions.

3. The computer-implemented method of claim 2, wherein the one or more conditions represented by the respective training data distribution comprise one or more of: (i) frequency content of the ground-truth data, (ii) frequency content of training inputs corresponding to the ground-truth data, (iii) a statistical property of the ground-truth data, or (iv) a statistical property of the training inputs.

4. The computer-implemented method of claim 1, wherein the attribute of each respective training data distribution comprises one or more classifications of features of the input data that are represented by the respective training data distribution, wherein the one or more classifications are a subset of a plurality of possible classifications of features of the input data, and wherein the plurality of possible classifications is represented by the plurality of training data distributions.

5. The computer-implemented method of claim 1, wherein the corresponding domain index value comprises multiple domain index values, wherein each respective domain index value of the multiple domain index values is selected from a predefined range and indicates an extent of a corresponding training data distribution to be used in generating the output value corresponding to the respective input value, and wherein the corresponding training data distribution of each respective domain index value of the multiple domain index values is one of the plurality of training data distributions.

6. The computer-implemented method of claim 5, wherein a number of domain index values in the multiple domain index values is equal to a number of training distributions in the plurality of training data distributions.

7. The computer-implemented method of claim 5, wherein a sum of the multiple domain index values corresponding to the respective input value is equal to a predetermined value, and wherein each respective domain index value of the multiple domain index values indicates a fraction of a total signal of the corresponding output value contributed by the corresponding training data distribution.

8. The computer-implemented method of claim 1, wherein the machine learning model has been trained using a training process comprising:

obtaining a training sample comprising a training input matrix and a ground-truth output matrix;

determining, for the training sample, a training domain index matrix comprising, for each respective training input value of the training input matrix, a corresponding training domain index value that indicates a corresponding training data distribution (i) to be used in generating a training output value corresponding to the respective training input value and (ii) to which the training sample belongs;

providing, to the machine learning model, the training input matrix and the training domain index matrix;

generating, by the machine learning model and based on the training input matrix and the training domain index matrix, a training output matrix comprising, for each respective training input value of the training input matrix, the corresponding training output value generated based on (i) the respective training input value and (ii) the corresponding training domain index value;

determining a prediction loss value using a prediction loss function configured to compare the training input matrix and the training output matrix; and adjusting one or more parameters of the machine learning model based on the prediction loss value.

9. The computer-implemented method of claim 8, wherein determining the training domain index matrix comprises:

determining the corresponding training data distribution to which the training sample belongs; and assigning, for each respective training input value of the training input matrix, a training domain index value associated with the corresponding training data distribution to which the training sample belongs.

10. The computer-implemented method of claim 8, wherein the training sample further comprises a ground-truth domain index matrix indicating the respective training data distribution to which the training sample belongs, and wherein the training process further comprises:

determining the training domain index matrix by a domain detection model and based on the training input matrix and the ground-truth output matrix of the training sample;

determining a domain loss value using a domain loss function configured to compare the training domain index matrix and the ground-truth domain index matrix; and based on the prediction loss value, adjusting one or more parameters of at least one of (i) the machine learning model or (ii) the domain detection model.

11. The computer-implemented method of claim 1, wherein the input matrix comprises an input image, and wherein the output matrix comprises an output image that represents one or more of: (i) a bounding box associated with an object represented by the input image, (ii) a segmentation map of the object represented by the input image, (iii) one or more coordinates associated with the object represented by the input image, or (iv) a representation of a pose of the object represented by the input image.

12. The computer-implemented method of claim 1, wherein the input matrix comprises an image, and wherein the output matrix comprises a depth map, and wherein the plurality of training data distributions comprises two or more of:

a first training data distribution generated based on a plurality of stereoscopic images;

a second training data distribution generated based on a plurality of multi-pixel images; or a third training data distribution generated based on processing of a plurality of monoscopic images by another machine learning model.

13. The computer-implemented method of claim 1, wherein determining the plurality of domain index values comprises:

determining, based on the input matrix and for each respective input value thereof, a corresponding attribute value of a particular attribute of the plurality of training data distributions; and determining, for each respective input value of the input matrix, the corresponding domain index value based on the corresponding attribute value.

14. The computer-implemented method of claim 1, wherein determining the plurality of domain index values comprises:

providing a user interface configured to allow for definition of the plurality of domain index values; and receiving, by way of the user interface, a definition of at least part of the plurality of domain index values.

15. The computer-implemented method of claim 1, further comprising:

determining a second domain index matrix that differs from the domain index matrix;

providing the input matrix and the second domain index matrix to the machine learning model; and generating, by the machine learning model and based on the input matrix and the second domain index matrix, a second output matrix that differs from the output matrix.

16. The computer-implemented method of claim 1, wherein the input matrix and the output matrix each have a first dimension, wherein the domain index matrix has a second dimension that is smaller than the first dimension and corresponds to a latent space of the machine learning model, wherein generating the output matrix comprises generating a latent space representation of the input matrix, and wherein a given domain index value corresponds to (i) a plurality of input values of the input matrix as represented at the first dimension and (ii) a single latent space value that represents, at the second dimension, the plurality of input values as part of the latent space representation of the input matrix.

17. A system comprising:

a processor; and a non-transitory computer-readable medium having stored thereon instructions that, when executed by the processor, cause the processor to perform operations comprising:

obtaining an input matrix representing input data;

determining a plurality of domain index values comprising, for each respective input value of the input matrix, a corresponding domain index value that indicates a corresponding training data distribution to be used in generating an output value corresponding to the respective input value, wherein the corresponding training data distribution is one of a plurality of training data distributions;

determining a domain index matrix comprising the plurality of domain index values;

providing the input matrix and the domain index matrix to a machine learning model that has been trained to generate output matrices using the plurality of training data distributions, wherein each respective training data distribution of the plurality of training data distributions is associated with an attribute that differs from a corresponding attribute of other training data distributions of the plurality of training data distributions; and generating, by an inference operation of the machine learning model and based on the input matrix and the domain index matrix, an output matrix comprising, for each respective input value of the input matrix, the corresponding output value generated based on (i) the respective input value and (ii) the corresponding domain index value such that the corresponding output value exhibits the attribute of the corresponding training data distribution.

18. A non-transitory computer-readable medium having stored thereon instructions that, when executed by a computing device, cause the computing device to perform operations comprising:

obtaining an input matrix representing input data;

determining a plurality of domain index values comprising, for each respective input value of the input matrix, a corresponding domain index value that indicates a corresponding training data distribution to be used in generating an output value corresponding to the respective input value, wherein the corresponding training data distribution is one of a plurality of training data distributions;

determining a domain index matrix comprising the plurality of domain index values;

providing the input matrix and the domain index matrix to a machine learning model that has been trained to generate output matrices using the plurality of training data distributions, wherein each respective training data distribution of the plurality of training data distributions is associated with an attribute that differs from a corresponding attribute of other training data distributions of the plurality of training data distributions; and generating, by an inference operation of the machine learning model and based on the input matrix and the domain index matrix, an output matrix comprising, for each respective input value of the input matrix, the corresponding output value generated based on (i) the respective input value and (ii) the corresponding domain index value such that the corresponding output value exhibits the attribute of the corresponding training data distribution.

19. The non-transitory computer-readable medium of claim 18, wherein the corresponding domain index value comprises multiple domain index values, wherein each respective domain index value of the multiple domain index values is selected from a predefined range and indicates an extent of a corresponding training data distribution to be used in generating the output value corresponding to the respective input value, and wherein the corresponding training data distribution of each respective domain index value of the multiple domain index values is one of the plurality of training data distributions.

20. The non-transitory computer-readable medium of claim 18, wherein the input matrix and the output matrix each have a first dimension, wherein the domain index matrix has a second dimension that is smaller than the first dimension and corresponds to a latent space of the machine learning model, wherein generating the output matrix comprises generating a latent space representation of the input matrix, and wherein a given domain index value corresponds to (i) a plurality of input values of the input matrix as represented at the first dimension and (ii) a single latent space value that represents, at the second dimension, the plurality of input values as part of the latent space representation of the input matrix.

\* \* \* \* \*